United States Patent [19]

Townsend

[11] Patent Number: 4,603,418
[45] Date of Patent: Jul. 29, 1986

[54] MULTIPLE ACCESS DATA COMMUNICATIONS CONTROLLER FOR A TIME-DIVISION MULTIPLEX BUS

[75] Inventor: Greg M. Townsend, Palatine, Ill.

[73] Assignee: Motorola, Inc., Schaumburg, Ill.

[21] Appl. No.: 511,804

[22] Filed: Jul. 7, 1983

[51] Int. Cl.[4] ............................ H04J 3/02; H04J 3/16
[52] U.S. Cl. ........................................ 370/85; 370/96; 370/95
[58] Field of Search ................. 370/95, 96, 85, 104

[56] References Cited

U.S. PATENT DOCUMENTS

| | | | |
|---|---|---|---|
| 3,633,169 | 1/1972 | Bickford | 370/90 |
| 3,784,752 | 1/1974 | Peron | 179/15 AQ |
| 3,816,666 | 6/1974 | Tomozawa et al. | 179/15 BM |
| 3,898,387 | 8/1975 | Fort | 179/15 BM |
| 3,932,698 | 1/1976 | Yanagimachi et al. | 178/6 |
| 4,037,199 | 7/1977 | Rozehnal et al. | 370/96 |
| 4,100,377 | 7/1978 | Flanagan | 179/15 AS |
| 4,100,533 | 7/1978 | Napolitano et al. | 370/96 |
| 4,149,144 | 4/1979 | Diefenderfer | 370/96 |
| 4,161,786 | 7/1979 | Hopkins et al. | 370/95 |
| 4,227,178 | 10/1980 | Gergaud et al. | 370/96 |
| 4,251,865 | 2/1981 | Moore et al. | 370/96 |
| 4,251,880 | 2/1981 | Baugh et al. | 370/80 |
| 4,313,196 | 1/1982 | Oblonsky | 370/95 |
| 4,322,576 | 3/1982 | Miller | 178/22.07 |
| 4,340,961 | 7/1982 | Capel et al. | 370/96 |
| 4,375,097 | 2/1983 | Ulug | 370/94 |

*Primary Examiner*—Douglas W. Olms
*Assistant Examiner*—Frank M. Scutch, III
*Attorney, Agent, or Firm*—James E. Jacobson, Jr.; Edward M. Roney; Donald B. Southard

[57] ABSTRACT

Method and apparatus are provided for control of a dedicated data slot in a time-division multiplex system for both voice and data communications enabling equal access to the data slot, efficient data throughput and reliability.

5 Claims, 7 Drawing Figures

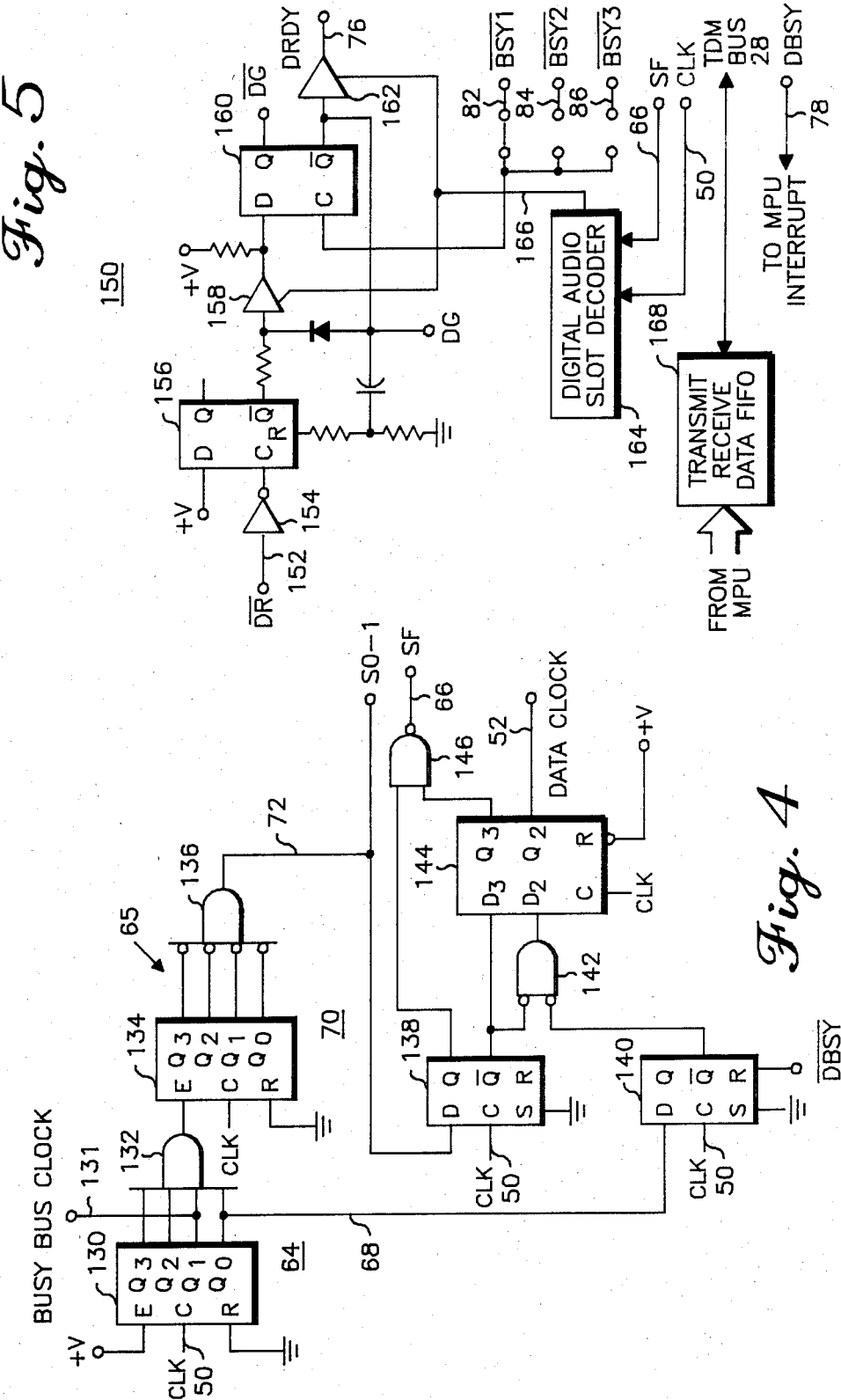

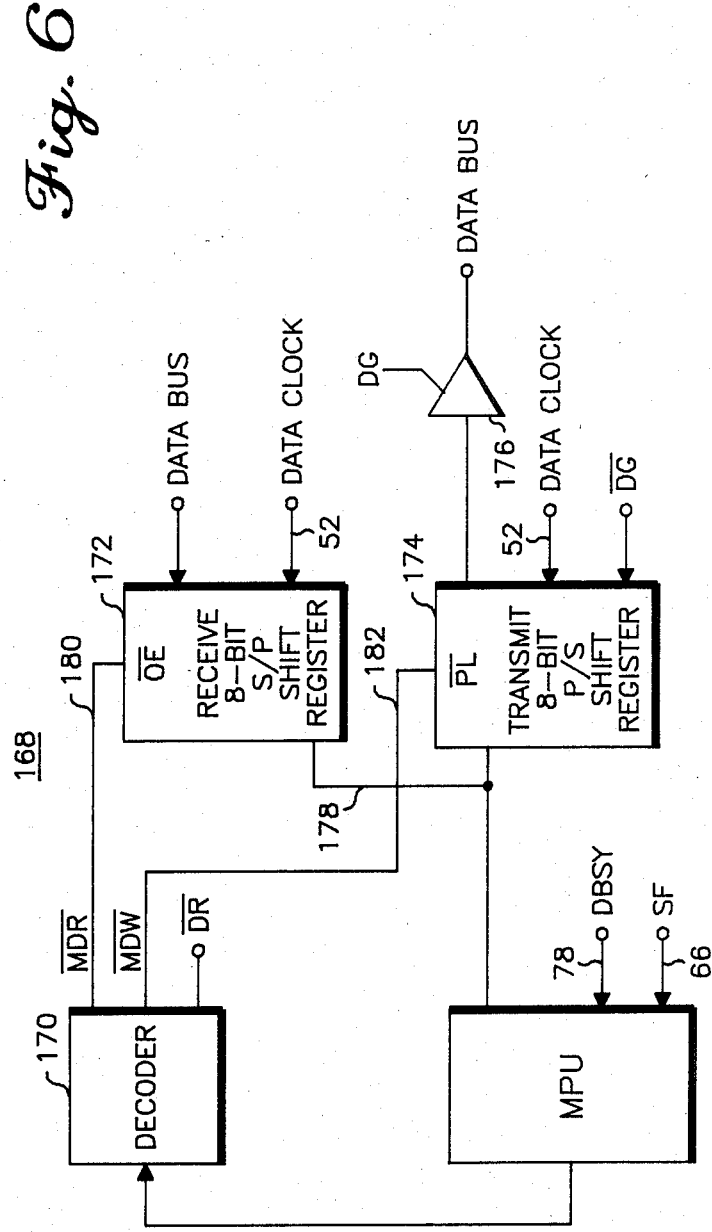

MULTIPLE ACCESS DATA COMMUNICATIONS CONTROLLER FOR A TIME-DIVISION MULTIPLEX BUS

BACKGROUND OF THE INVENTION

This invention relates generally to communications controller and, more particularly, relates to a multiple access data communications controller for a time-division multiplex system for both voice and data communications.

DESCRIPTION OF THE PRIOR ART

Time division multiplex systems are well known in the communications art. Such systems have alternately been employed in voice communications and in high speed multiple access data communications systems.

One known high speed data communications multiple access system employs what can be described as a contention approach to gain control of the data channel. In this system, any of the nodes that wants to send data, send a few bits and then listens to determine if there was a data collision with another node. If not, then the node sends the data including a string of 1010 . . . bits to enable synchronizing with the receiving node. Thus, there is inefficiency in that overhead or wasted time is required for synchronization. In addition, the effective throughput of this system diminishes rapidly as traffic density increases. There is also the substantial risk that a defective node may fail to observe the defined bus protocal and monopolize the data channel.

Problems with known multiple access data communications controllers generally include efficiency, reliability and cost.

SUMMARY OF THE INVENTION

It is accordingly an object of the invention to provide a novel and improved high speed multiple access data communications controller for a time-division multiplex bus.

It is another object of the invention to provide equal access to a dedicated data slot on the time-division multiplex bus to each of a plurality of nodes coupled to said bus.

It is a further object of the invention to provide efficient use of said dedicated data slot.

It is another object of the invention to provide fail-safe operation in the use of said dedicated data slot.

Briefly, the present invention provides a method of assigning a dedicated data slot on a time-division multiplex bus to one of a plurality of nodes such that each of the plurality of nodes has equal access to the dedicated data slot. The method comprises the steps of: (a) sequentially polling the plurality of nodes; (b) receiving a requesting signal from a node; (c) inhibiting the polling and simultaneously granting control of the dedicated data slot to said requesting node; and (d) resuming sequential polling following said requesting node.

Apparatus is provided to enable performing said method of the invention.

DESCRIPTION OF THE DRAWINGS

FIG. 4 is a schematic diagram illustrating the TDM Bus Slot Address Decoder and Data Slot Decoder as shown in FIG. 2;

FIG. 5 is a partly schematic block diagram illustrating the data channel access port according to the invention;

FIG. 6.is a block diagram of the transmit/receive data FIFO as shown in FIG. 5.

DESCRIPTION OF THE PREFERRED EMBODIMENT

Figure 1:
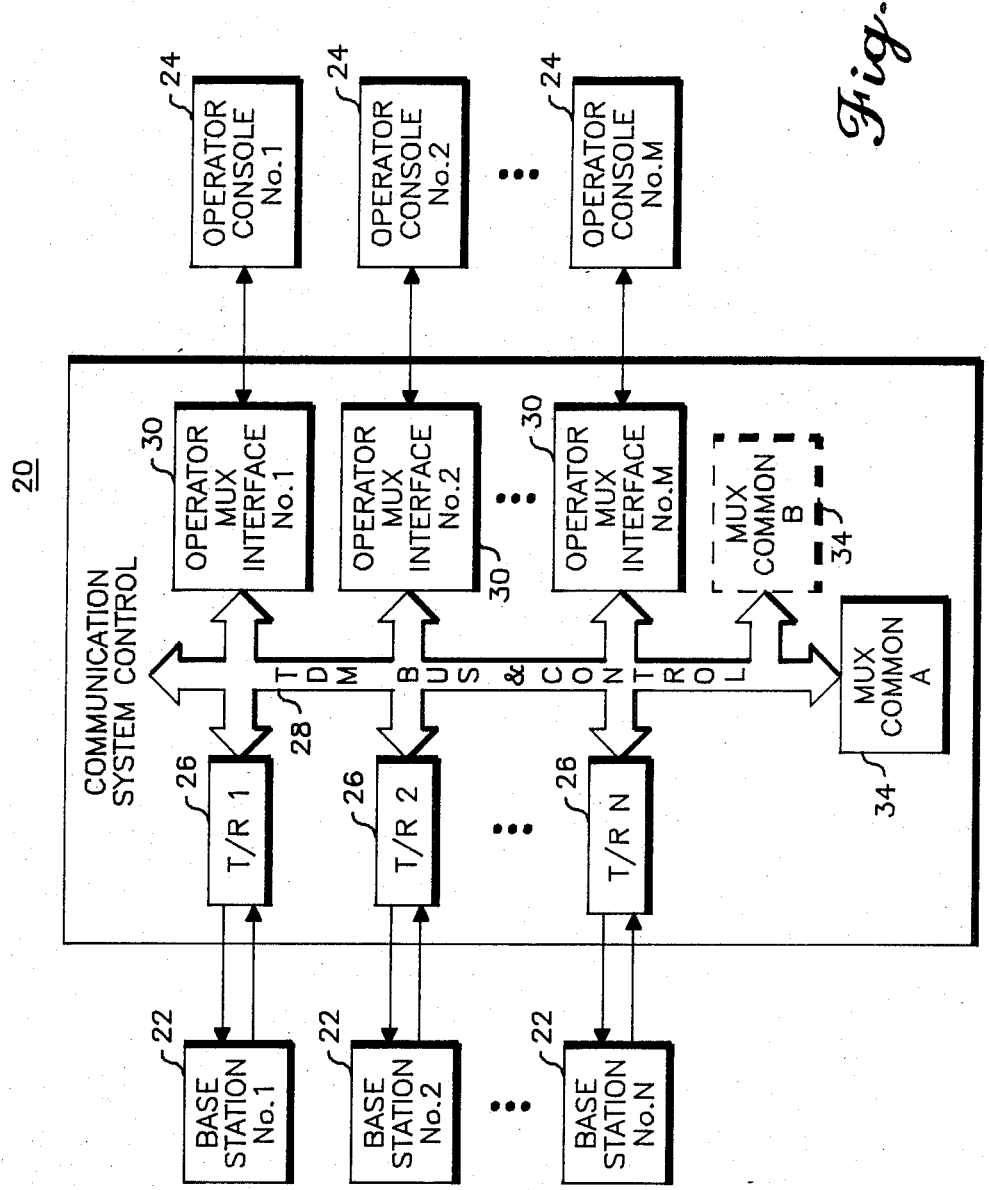
FIG. 1 is a generalized block diagram of a communications system including a time-division multiplex communications/control center system.

Referring to FIG. 1, there is shown a time-division multiplex communications control center system wherein the subject invention can be employed and is designated generally by the reference character 20. A plurality of sources including base stations number 1 through number N and designated generally by the reference character 22 and a plurality of operator consoles number 1 through number M and designated generally by the reference character 24 are connected for bidirectional audio and data transfer. The central control includes a plurality of nodes or transmit/receive modules number 1 through N corresponding to the number of stations 22. The transmit/receive (T/R) modules 26 connect the base stations 22 to operator consoles 24 through a time-division multiplex bus 28. Additionally, a plurality of nodes, or operator multiplex (MUX) interface modules number 1 through number M, designated generally by the reference character 30, are provided between the time-division multiplex bus 28 and each of the operator consoles 24. A multiplex (MUX) common module 34 is connected to the time-division multiplex bus 28 to provide all the timing and control signals necessary for the operation of the system 20. A redundant MUX common B module is shown as an optional element to provide increased system reliability in case of failure of the MUX common A module 34. MUX common modules A, B can be provided to share control of the communications system fifty percent of the time, such that the possibility of an undetected failure in a standby module is avoided and a single failure of one module will not bring down the entire communications system 20.

Figure 2:
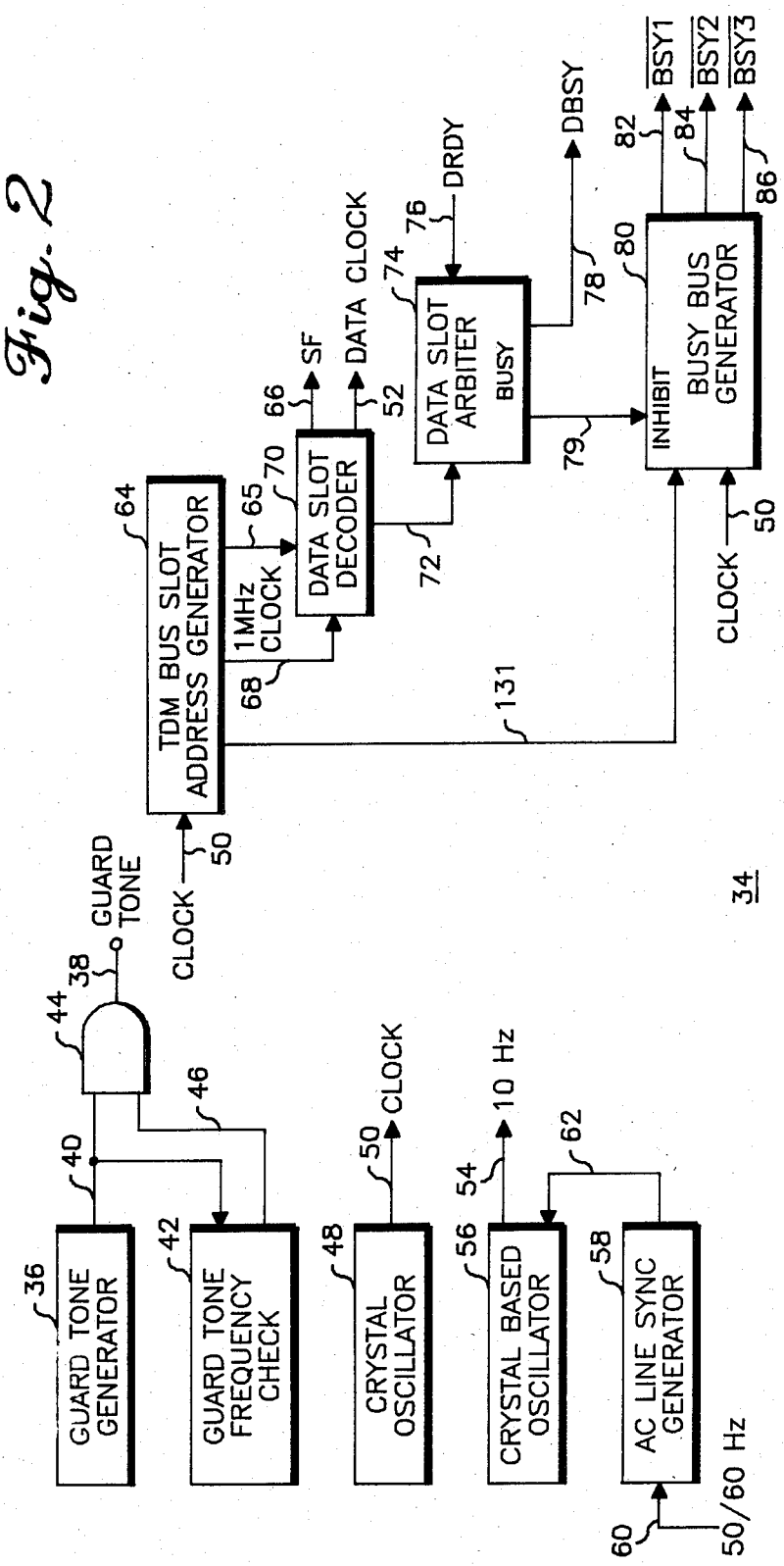
FIG. 2 is a block diagram illustrating a MUX Common module as shown in FIG. 1 according to the invention.

Referring to FIG. 2, there is shown a block diagram illustrating the MUX common module 34 according to the invention. MUX common module 34 includes a guard tone generator 36 to provide a guard tone signal 38 to all T/R modules 26 and operator MUX interface modules 30. The output signal 40 of guard tone generator 36 is coupled to a guard tone frequency check circuit 42 and an AND gate 44. Guard tone frequency check circuit 42 is provided to monitor the guard tone generator 36 for proper operation. Guard tone frequency check circuit 42 generates an output signal 46 that is coupled to AND gate 44. Signal 46 is a logic high as long as guard tone generator 36 operates properly. The guard tone frequency check circuit can be provided by utilizing commercially available parts, such as D Flip/Flops Motorola MC14013 and divider, Motorola MC14569. If a failure occurs of either a frequency or a phase error, the guard tone frequency check circuit switches the output signal 46 to a logic low which inhibits guard tone signal 38. The alternate MUX common module 34 may be activated to take control.

A crystal oscillator 48 is employed to provide a clock output 50 to control the time-division multiplex bus and data bus. The frequency of crystal oscillator 48 is selected to provide an appropriate bit time for data and digital audio communications on time-division multiplex bus 28 and to T/R modules 26 and operator MUX interface modules 30. Additionally, a 10 Hz signal 54 is generated on the MUX common 34 to provide an additional real-time base clock signal to operator MUX interface modules 30. Crystal-based oscillator circuit 56 may be employed to generate the 10 Hz output signal 54. In order to maintain the desired accuracy of the 10 Hz signal 54, an AC line SYNC generator circuit 58 having a line frequency 50/60 Hz input signal 60 may be employed to provide a synchronizing signal 62 for the crystal-based oscillator circuit 56. Synchronizing signal 62 is employed to compensate for any skew in the crystal frequency and to maintain an accurate 10 Hz signal 54. Guard tone generator 36 and crystal oscillators 48, 56 can be provided with any standard type of crystal oscillator.

In a time-division multiplex bus 28, digital data are transmitted in binary-coded pulse groups during recurring time slots. The recurrence period of the group of time slots or frame may be defined to have a duration of 125 microseconds, with the frame including 32 slots, each having a duration of 3.9 microseconds. Each slot contains a group of 8 binary-coded pulses or bits, these 8 bits forming a word. Clock 50 may be approximately 2 Mhz giving a 64 Kbit/Sec data rate for the digital audio and data communications. The time-division multiplex bus can be, for example, three busses running in parallel for digital audio and one separate data bus. Each of the nodes 26, 30 is assigned to a predetermined slot on one of the three buses in the TDM bus 28 for audio communications. Each of the nodes 26, 30 share a dedicated data slot or slots on the data bus.

A time-division multiplex bus slot address generator 64 is provided on the MUX common 34 to enable transmitting and receiving data and digitized audio to the correct slot on TDM bus 28 corresponding to each of the nodes 26, 30. Clock signal 50 is input into TDM bus slot address generator 64 to enable counting the data bits in the frame. An output 68 and outputs 65 of slot address generator 64 are connected to a data slot decoder 70. Data slot decoder 70 outputs a start of frame (SF) signal 66 and a data clock signal 52. Data slot decoder 70 also provides an output signal 72 corresponding to the dedicated data slot on the data bus that is shared by all nodes 26, 30. Data slot signal 72 is coupled to a data slot arbiter circuit 74. The data slot arbiter circuit 74 provides equal access to the dedicated data slot for all the nodes 26, 30.

Data slot arbiter circuit 74 synchronously polls each of the possible data sources 26, 30 for a request for use of the data slot. A data request (DRDY) signal 76 is received by data slot arbiter circuit 74 and a data busy (DBSY) signal 78 is generated by arbiter circuit 74 in response to the data request.

The data slot arbiter circuit 74 grants control of the dedicated data slot or slots on the data bus in response to a data request signal 76 from one of the nodes 26, 30. Data slot arbiter circuit 74 provides a data busy (DBSY) signal 78 in response to data request signal 76. The inhibit signal 79 is input to an inhibit port of a busy bus generator 80, while the data slot is being used by one of the nodes.

Busy bus generator 80 provides for polling each of the time-division multiplex busses 28 such that each of the data sources 26, 30 have equal access to the data slot. Busy bus generator 80 provides output signals corresponding to the separate multiplex busses. For the example of three time-division multiplex busses for the digitized audio, busy bus generator 80 includes output signals 82, 84, 86 labeled BSY1, BSY2 and BSY3 corresponding to each of the three busses. The state of outputs 82, 84, 86 correspond to the multiplex bus that is being polled when the data slot is inactive, and sequentially change state for the duration of one data frame. When an inhibit signal 79 is received by busy bus generator 80, outputs 82, 84 and 86 are disabled to inhibit the polling process. The polling process is inhibited during the requesting node time slot and resumes with the next node following the requesting node after a predetermined number of frames, whereby each of the nodes 26, 30 are given equal access to transmit data.

Figure 3:
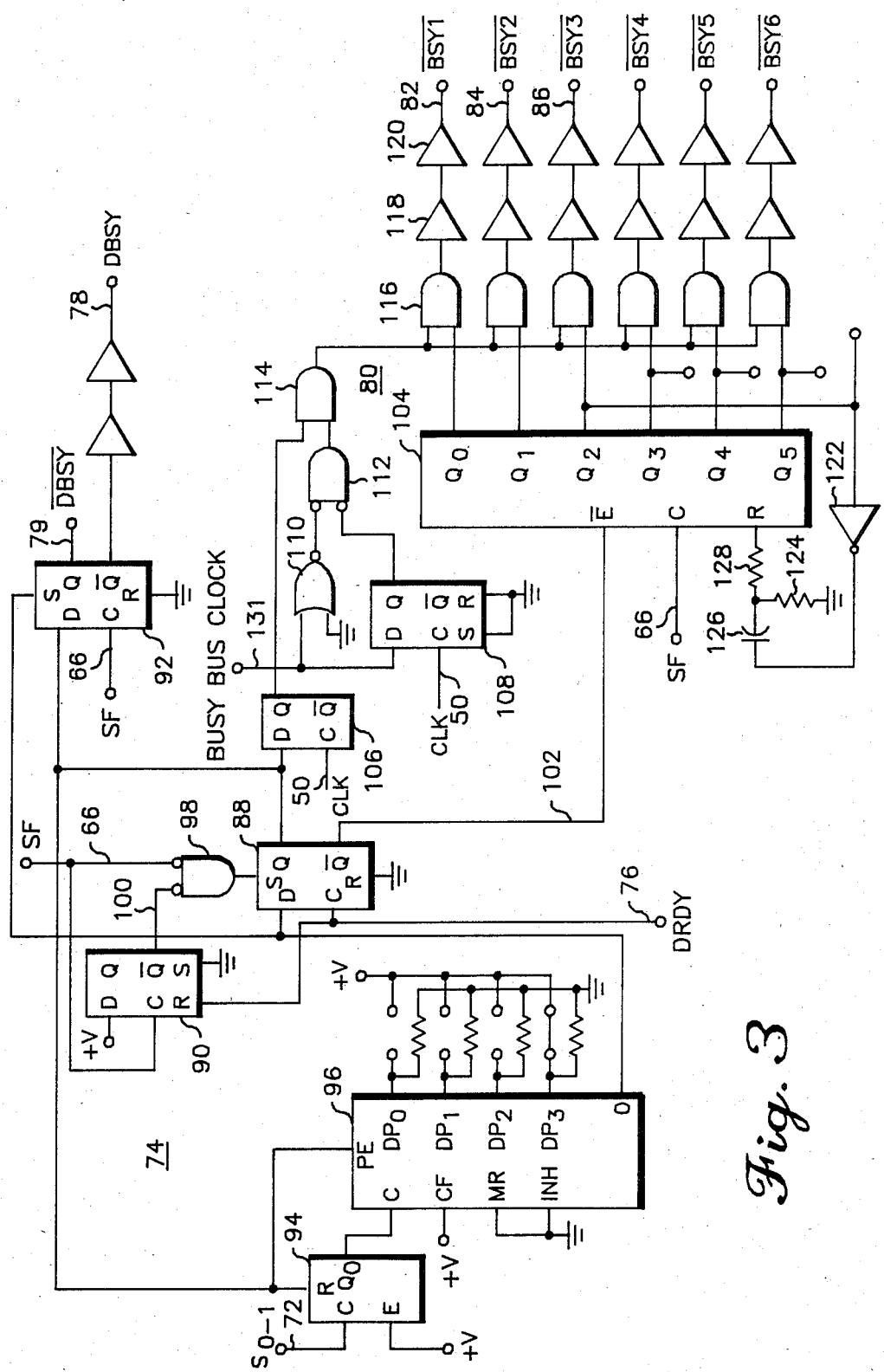
FIG. 3 is a schematic diagram illustrating the Data Slot Arbiter and Busy Bus Generator as shown in FIG. 2.

Referring now to FIG. 3 there is shown an embodiment of the data slot arbiter 74 and the busy bus generator 80 according to the invention.

The data slot arbiter 74 includes Flip/Flops 88, 90, 92, such as Motorola CMOS MC14013B, up counter 94, such as Motorola CMOS MC14520B, and programmable divide-by-N 4-bit counter 96, such as Motorola CMOS-type MC14526B, and a NOR gate 98, such as Motorola MC14001.

The data ready signal 76 is coupled to the clock input of Flip/Flop 88 and also is coupled to the reset input of Flip/Flop 90. The data input of Flip/Flop 90 is coupled to a positive voltage shown as +V for a high input state. The start of frame signal 66 is coupled to the clock input of Flip/Flop 90 and into one input of NOR gate 98, and to the clock input of Flip/Flop 92. The $\bar{Q}$ output 100 of Flip/Flop 90 is coupled to the other input of NOR gate 98. The output of NOR gate 98 is coupled to the set input of Flip/Flop 88. The Q output of Flip/Flop 88 is coupled to the data input of Flip/Flop 92, the reset input of up counter 94 and the busy bus generator 80. The $\bar{Q}$ output of Flip/Flop 88 is coupled to the busy bus generator 80.

The up counter 94 is used as a divide-by-2. The enable input of counter 94 is coupled a positive voltage shown as +V for a continuous high input enable. $S_0-1$ signal 72 is a high pulse during the dedicated data slot time period and is coupled to the clock input of counter 94. The Q output of counter 94 is coupled to the C input of programmable counter 96. The master reset and inhibit inputs of presettable counter 96 are coupled to a logic ground. The CF input of counter 96 is coupled to a positive voltage for a logic high. The Q output of Flip/Flop 88 is coupled to the preset enable input of counter 96. Output 0 of presettable counter 96 is coupled to the data input of Flip/Flop 88 and to the set input of Flip/Flop 92.

When the data slot is inactive the DRDY signal 76 remains at a logic low level. This removes the reset signal from D Flip/Flop 90. The SF signal 66 is a narrow, low going pulse which occurs at the start of every frame on the TDM bus 28. The trailing edge of this pulse clocks the D Flip/Flop 90 resulting in the Q output going high and the $\bar{Q}$ output going low. With the $\bar{Q}$ output low, one input of NOR gate 98 is enabled. When the SF signal pulses low at the start of the next frame, the output of NOR gate 98 will pulse high. This high pulse sets D Flip/Flop 88 causing Q output thereof to go high.

The high Q output signal from D Flip/Flop 88 is coupled to the reset input of counter 94. With the reset input high the counter 94 sets its Q output low and ignores the clocking signal 72, $S_0-1$. $S_0-1$ signal 72 is a signal which goes high for the duration of the data slot in each frame. The high signal at the Q output of Flip/Flop 88 is also coupled to the preset enable input, PE, of the counter 96. With the PE input high the down counter 96 presets to the binary value programmed on the DPO-DP3 inputs. The programming is selected to define the number of successive data slots required to transmit a data packet. The 0 output of the down counter 96 goes high only when the counter reaches zero. Since in the preset mode the counter is initialized to a value other than zero, the 0 output will be a logic low. This removes the set condition from Flip/Flop 92.

The high signal at the Q output of Flip/Flop 88 is also coupled to the D input of D Flip/Flop 92. When the SF pulse 66 occurs, this high will be clocked into the Flip/Flop 92 causing the Q output 79 ($\overline{DBSY}$) to go high and the $\overline{Q}$ output 78 (DBSY) to go low. Thus, the high signal at the Q output of D Flip/Flop 88 along with the low signal at the $\overline{Q}$ output 102 is coupled additionally to the busy bus generator 80. The Data Slot Arbiter 74 is now initialized and ready to recognize any node in the system which requests to use the data slot.

When the polling means, comprised of the busy bus generator 80, identifies a node requesting to use the data slot, a high going pulse occurs on the DRDY input 76. This pulse occurs during the unique time slot associated with the particular requesting node and will continue to occur during that time slot in each successive frame for a predetermined number of frames. The DRDY pulse 76 clocks the low signal at the 0 output from down counter 96 into D Flip/Flop 88 causing Q output thereof to go low. This low signal from the Q output along with the high signal at the $\overline{Q}$ output of Flip/Flop 88 are routed to the busy bus generator 80 which, in response, immediately inhibits the polling process.

The low signal at the Q output of Flip/Flop 88 is clocked into Flip/Flop 92 on the next SF pulse 66 which causes the $\overline{DBSY}$ signal 79 to go low and the DBSY signal 78 to go high indicating that the data slot is busy or occupied. The DBSY signal 78 is routed to all other nodes 26, 30 to alert the associated microprocessors therewith that a data packet is being sent.

The low signal at the Q output of Flip/Flop 88 also removes the reset from the counter 94 and the preset from the down counter 96. The counter 94 now clocks on the $S_{O-1}$ signal 72 causing the Q0 output to change state on each successive $S_{O-1}$ pulse. This effectively divides the $S_{O-1}$ signal 72 by 2 and then couples it to the clock input of down counter 96. The first $S_{O-1}$ signal 72 will cause the Q0 output of counter 94 to go high which in turn will decrement the down counter 96. The second $S_{O-1}$ signal 72 will toggle the Q0 output of counter 94 low, having no effect on the down counter 96. The next $S_{O-1}$ signal 72 will toggle the Q0 output of 94 high which will decrement counter 96 once more. This process continues until, $2N-1$ $S_{O-1}$ pulses have occurred, where N is equal to the binary value programmed at the down counter 96 inputs DPO-DP3. At this time the down counter will have decremented to zero and the O output will go high. This high will immediately set Flip/Flop 92, causing the $\overline{DBSY}$ output signal 79 to return high and the DBSY output signal 78 to return low. This signifies that the transmission of the data packet is complete and the data slot is no longer busy.

When the next DRDY pulse 76 occurs, during the time slot corresponding to the requesting node, the high signal at the O output of down counter 96 will be clocked into Flip/Flop 88 causing the Q output to again go high. This immediately resets counter 94 and presets down counter 96, returning both to the initialized condition. The high signal at the Q output therefrom are routed to the busy bus generator 80 which then resumes polling with the next node in sequence following the requesting node. The data slot arbiter 74 is now ready to recognize a new data request.

As was mentioned hereinbefore, the DRDY pulses 76 continue to be generated by the requesting node for a predetermined number of successive frames during the requesting nodes particular time slot. The number of frames is controlled by the programming of the down counter 96 and is equal to $2N-1$. A potential failure mode exists whereby the DRDY pulses may cease before the predetermined number have been sent. If this were to occur, the circuitry described so far would latch up with the Q output of Flip/Flop 88 low. As a result, busy bus generator 80 would be inhibited from polling for an indefinite period of time thereby preventing any other node from transmitting a data packet. In order to guard against this potential failure mode, the circuit comprised of Flip/Flop 90 and NOR gate 98 are incorporated.

The NOR gate 98 output is normally low since the SF signal 66 at one input thereof is normally high. At the trailing edge of the SF signal 66, the Flip/Flop 90 is set causing its $\overline{Q}$ output 100 to go low. The signal 100 enables one input of NOR gate 98. Under normal operation, when the data slot is active a DRDY pulse 76 will be received before the next SF signal 66.

The DRDY pulse will reset Flip/Flop 90 causing the $\overline{Q}$ output thereof to return high and disabling one input of NOR gate 98 with the signal 100. Therefore, when the next low going SF pulse occurs, the NOR gate 98 output will remain low. If the DRDY pulse fails to occur during a frame interval, then the Flip/Flop 90 will still be in a set mode, with the $\overline{Q}$ output low, when the next low going SF pulse occurs. As a result, the NOR gate 98 output will pulse high, setting Flip/Flop 88 back to its idle state with the Q output high. In the manner, the consequences of the aforementioned potential failure mode is avoided.

The busy bus generator 80 includes a Johnson ring counter 104, Flip/Flips 106, 108, NOR gates 110, 112, AND gates 114, 116, hex buffers 118 and hybrid bus drivers 120. A satisfactory busy bus generator 80 has been constructed utilizing the following commercially available CMOS integrated circuits;

Johnson ring counter 104: Motorola MC14017
    Flip-Flops 106, 108: Motorola MC14013
    NOR gates 110, 112: Motorola MC14001
    NAND gates 114, 116: Motorola MC14081
    Hex buffers 118: Motorola MC14503

The busy bus clock signal is coupled to NOR gate 110 and also to the data input of Flip/Flop 108. The clock signal 50 is coupled to the clock of Flip/Flop 108. The set and reset input of Flip/Flop 108 are coupled to a logic ground. The Q output of Flip/Flop 108 is coupled to NOR gate 112. The other input to NOR gate 112 is coupled to the output of NOR gate 110. The output of NOR gate 112 is coupled to AND gate 114. The Q output of Flip/Flop 106 is coupled to the other input of AND gate 114. The output of AND gate 114 is coupled to one input on each of AND gates 116 and the other input to each of the AND gates 116 is coupled to the outputs $Q_0$, $Q_1$, $Q_2$, $Q_3$, $Q_4$, and $Q_5$ of counter 104. The $Q_2$ output of counter 104 is coupled to inverter 122. The output of inverter 122 is coupled to the reset input of counter 104 through the circuit formed of resistors 124, 128, and capacitor 126. The clock input (c) of counter 104 is connected to the SF signal 66 and the enable input ($\overline{E}$) is connected to the $\overline{Q}$ output of Flip/Flop 88.

The busy bus clock signal 131 is output from the TDM bus slot address generator 64 and is a square wave of approximately 500 KHZ. At this frequency, two complete cycles of the busy bus clock occur during each time slot on the TDM bus. The circuit comprised of Flip/Flop 108 and NOR gates 110 and 112 functions to generate a narrow pulse at the output of NOR gate 112 in response to each rising edge of the busy bus clock 131. Each pulse has a high going period equal to one CLOCK 50 period of approximately 500 ns. As discussed in the description of the data slot arbiter 74, the Q output of Flip/Flop 88 is high when the data slot is inactive. This high signal is clocked through Flip/Flop 106 to enable one input of AND gate 114. When AND gate 114 is thereby enabled, the pulses at the output of NOR gate 112 are coupled through AND gate 114 to one input on each of the AND gates 116.

The Johnson ring counter 104 is shown configured for three bits corresponding to three time-division multiplex busses. In the 3-bit configuration, the counter 104 is reset by the falling edge of the $Q_2$ output that is coupled through inverter 122 to the reset input. Resistor 124 and capacitor 126 provide a filter for the input to the reset. Additionally, the resistor 128 is provided for input protection of the reset input of counter 104. The outputs of counter 104 $Q_0$, $Q_1$, $Q_2$ correspond to the time division busses No. 1, 2 and 3. The outputs $Q_3$, $Q_4$, $Q_5$ are optional for additional time-division multiplex busses. The start-of-frame SF signal 66 is coupled to the clock input of counter 104. During the polling process, the $\overline{Q}$ output 102 of Flip/Flop 88 is low and is coupled to the clock enable bar input of counter 104 whereby the counter is enabled to count the SF signal 66. One of the outputs $Q_0$, $Q_1$ $Q_2$ alternately go high in response to each SF signal 66.

When the $Q_O$ output of Johnson ring counter 104 is high the $Q_1$ and $Q_2$ outputs are low. The AND gates 116 connected to $Q_1$ and $Q_2$ outputs of counter 104 are therefore disabled holding the $\overline{BSY2}$ signal 84 and the $\overline{BSY3}$ signal 86 at a logic low level. The AND gate 116 coupled to the high QO output of counter 104 is enabled and passes the high going pulses from the AND gate 114 through to the $\overline{BSY1}$ bus 82. These high going pulses on the $\overline{BSY1}$ bus, two of which occur during each time slot, effectively poll the 32 possible nodes 26, 30 associated with the first TDM bus. When the next SF signal occurs, the QO output of ring counter 104 goes low and the Q1 output goes high. During this frame the 32 possible Nodes 26, 30 associated with the second TDM bus are effectively being polled in a manner similar to that described for the QO case above. The process continues on the next SF pulse 66 for Q2 and the third TDM bus and then repeats.

When the polling process discovers a requesting node, the DRDY input 76 to the data slot arbiter will pulse high. As described earlier, thus causes the signal 102 from the data slot arbiter 74 to go high and the Q output of Flip/Flop 88 to go low during the time slot associated with the requesting node. The high signal 102 disables the Johnson ring counter 104 so that it no longer advances on the SF signal 66 and freezes it at its current state. At the same time, the low Q signal from Flip/Flop 88 is clocked through Flip/Flop 106 and disables AND gate 114 causing the output to go low. This low further disables one input on each of the AND gates 116 ensuring that all $\overline{BSY}$ outputs 82, 84, 86 are low. This inhibits the polling process. Following the last DRDY pulse, the busy bus generator is re-enabled part of the way through the slot corresponding to the requesting node. One busy bus pulse is sent on the corresponding $\overline{BSY}$ output during the aforementioned slot which removes control of the data slot from the requesting node. Normal polling then resumes with the next node in sequence.

Referring to FIG. 4, there is shown a schematic diagram illustrating the time-division multiplex bus slot address generator 64 and data slot decoder 70 as shown in FIG. 2. The data slot decoder 70 provides a signal 72 ($S_{0-1}$) that is high corresponding to the dedicated data slots. The TDM bus slot address generator 64 is coupled to the data slot decoder 70 by signal 68 and by the signals 135. The TDM bus slot address generator 64 includes an up counter 130 such as Motorola CMOS-type MC14520B, 4-input NAND gate 132, up counter 134, such as a Motorola CMOS-type MC14520B.

Counters 130, 134 are shown configured with the reset input coupled to a logic ground, and the system clock 50 coupled to the clock inputs of both counters. The enable input of clock 134 is shown coupled to a positive voltage for a constant logic high. The outputs of counter 130 $Q_0$, $Q_1$, $Q_2$, $Q_3$ are coupled to the inputs of the 4-input AND gate 132. The output of AND 132 is coupled to the enable input of counter 134. Outputs $Q_0$, $Q_1$, $Q_2$, $Q_3$ of counter 134 comprise the signals 135.

The data slot decoder 70 includes the 4-input NOR gate 136, Flip/Flops 138, 140, NOR gate 142, Flip/Flop 144 and NAND gate 146. The system clock 50 is coupled to the clock inputs of Flip/Flops 138, 140. The $Q_0$ output of counter 130 is labeled 68 and is coupled to the data input of Flip/Flop 140. The signals 135 are connected to the inputs of the 4-input NOR gate 136. The output of NOR gate 136 is signal 72, $S_{O-1}$. The data input of Flip/Flop 138 is coupled to signal 72. The Q bar output of Flip/Flop 138, 140 are coupled to the inputs of NOR gate 142. The output of NOR gate 142 is coupled to the $D_2$ input of Flip/Flop 144. Flip/Flop 144 can be a Motorola CMOS-type MC14175. The Q bar output of Flip/Flop 138 is coupled to the D3 input of Flip/Flop 144 and the clock 50 being coupled to the clock input thereof. The $Q_2$ output of Flip/Flop 144 provides the data clock signal 150 that is enabled when data is being sent. The $Q_3$ output of Flip/Flop 144 is coupled to an input of NAND gate 146, and the Q output of Flip/Flop 138 is coupled to the NAND gate 146. The output of NAND 146 provides the start-of-frame signal 66.

The CLK signal 50 which is a square wave at the TDM bus clock rate of approximately 2 MHz is input to the four-bit binary counters 130 and 134. The application of AND gate 132 in conjunction with the counters 130 and 134 forms a synchronous 8-bit binary counter. The counter starts at 0; counts to 255 and then starts over at 0. This corresponds to the frame rate on the TDM bus 28 and to the 256 bits in each frame. The signal 68 is tapped off of the Q0 output of counter 130 which has a frequency of 1 MHz; half the CLK 50 frequency. The signal 131 is generated at the Q1 output of counter 130 and has a frequency of 500 KHz, ¼ that of CLK 50.

The four outputs of counter 134 are coupled to 4-input NOR gate 136. The output of NOR gate 136 will go high when all four of its inputs are low. The four outputs of counter 134 are the 4 most significant bits of the 8-bit counter, therefore, N0R gate 136 will be high for counts 0 through 15 of the frame. Since each slot is defined as 8 counts and slot 0 is defined to start a count zero, the NOR gate 136 output is high during both slot 0 and 1, hence the notation $S_{0-1}$. The $S_{0-1}$ time interval is defined to be the data slot in this embodiment of the invention.

The $S_{0-1}$ signal 72 is applied to the rising edge differentiator circuit formed by Flip/Flop 138, the D3-Q3 section of Flip/Flop 144, and the NAND gate 146. The SF signal 66 is generated at the output of gate 146 and consists of a one CLK period wide, high-going pulse, which occurs one CLK period after the rising edge of the $S_{0-1}$ signal 72. The SF signal 66, therefore, pulses high at the start of every frame and is used in conjunction with the CLK signal 50 by the nodes 26, 30 to synchronize to the TDM bus.

The DATA CLOCK signal 52 is generated by Flip/Flop 140, NOR gate 142, and the D2-Q2 section of Flip/Flop 144. This signal consists of 8 clock pulses, which occur during the $S_{0-1}$ time interval, at a rate of 1 MHz, whenever the data slot is being used (i.e., DBSY is high).

Referring to FIG. 5, there is shown a partly schematic block diagram illustrating the data channel access port designated generally by the reference character 150. A data channel access port is provided with each of the nodes 26, 30 in the communications system. A microprocessing unit at the node provides a data request ($\overline{DR}$) signal 152 through inverter 154 to the clock input of Flip/Flop 156. The data input of Flip Flop 156 is coupled to a positive voltage for a logic high. The $\overline{Q}$ output of Flip/Flop 156 is coupled through a resistor to the input of tri-state buffer 158. The output of tri-state buffer 158 is coupled to the data input of a Flip/Flop 160. The $\overline{Q}$ output of Flip Flop 160 is coupled through a resistor capacitor network to the reset input of Flip/Flop 156, through a diode to the input of tri-state buffer 158, and to the input of tri-state buffer 162. The output of tri-state buffer 162 is the data ready (DRDY) signal 76. The clock input of Flip/Flop 160 is coupled to the busy bus generator output signal corresponding to the node for one of the time-division multiplex busses. A jumper is shown from $\overline{BSY1}$ signal 82 corresponding to TDM bus No. 1 in the illustration of FIG. 5. A digital audio slot decoder 164 is synchronized with the time-division multiplex bus 28 with the signals SF 66 and CLK 50 and provides an output signal 166 that is high during the predetermined time slot in the time-division multiplex bus 28 for the particular node. Output signal 166 of slot decoder 164 is coupled to the enable inputs of tri-state buffers 158, 162.

A transmit/receive data first in/first out module 168 is provided between time-division multiplex bus 28 and the microprocessor unit at the node. The data busy signal 78 is coupled to an interrupt port of microprocessing unit from the data slot arbiter circuit 74 shown in FIG. 3.

A satisfactory data channel access port has been constructed utilizing the following commercially available CMOS integrated circuits:
 Hex Schmitt trigger 154: Motorola MC14584
 Flip/Flop 156, 160: Motorola MC14013
 Hex tri-state buffer 158, 162: Motorola MC14503
 Digital audio slot decoder: MOTOROLA (TSAC) MC14416

The MPU on the node outputs a low signal to the $\overline{DR}$ (data request) input 152 of inverter 154 when a data packet is ready for transmission. The output of inverter 154 pulses high which clocks the Flip/Flop 156 and latches the $\overline{Q}$ output thereof low. The DG output from Flip/Flop 160 is normally low which allows the low signal at the Q output of Flip/Flop 156 to be coupled to tri-state buffer 158. Tri-state buffer 158 is enabled during the particular time slot corresponding to node by the digital audio slot decoder 164. During this period the latched low signal from Flip/Flop 156 is coupled to the data input of Flip/Flop 160. If the busy bus generator 80 is polling that particular node, then a high-going pulse will occur on $\overline{BSY1}$ input 82 during this time slot. The $\overline{BSY1}$ 82 pulses will clock the low signal into Flip/Flop 160 causing the $\overline{DG}$ signal to go low and the DG signal (data grant) to go high. The rising edge of the DG signal is coupled through the resistor capacitor network to reset the data request latch Flip/Flop 156. This causes the $\overline{Q}$ output of the Flip/Flop 156 to return high, ready to accept another $\overline{DR}$ input 152.

The tri-state buffer 162 is also enabled during this time slot so the high DG signal is coupled through to pulse the DRDY output 76. In recognition of the DRDY pulse, the data slot arbiter 74 should immediately inhibit the busy bus generator before the second pulse occurs on $\overline{BSY1}$ 82 input. Therefore, the DG signal will remain high and the $\overline{DG}$ signal will remain low until the busy bus generator resumes its polling. During each time slot, corresponding to the requesting node, the tri-state buffer 162 is enabled to couple another pulse to the DRDY output 76.

When the busy bus generator 80 resumes the polling sequence, one pulse will occur by $\overline{BSY1}$ 82 during the requesting nodes time slot. Buffer 158 will be enabled and will couple the high supplied through the diode from the DG signal to the data input of Flip/Flop 160. The pulse on the $\overline{BSY1}$ input 82 will clock this high into Flip/Flop 160 causing the $\overline{DG}$ signal to return high and the DG (data grant) signal to return low. This indicates that the time allocated to the requesting node for use of the data slot is over which means for normal operation that the complete data packet has been transmitted through the data slot.

If the DRDY signal 76 is not recognized by the data slot arbiter following the initial polling of the requesting node, due to perhaps a faulty buffer 162, the second pulse will occur on $\overline{BSY1}$ 82. This second pulse will clock a high into Flip/Flop 160 causing DG to return low. This is another fail-safe feature which prevents a given node from assuming control of the data slot when it is not recognized by the data slot arbiter 74.

Referring now to FIG. 6, there is shown a block diagram illustrating the transmit/receive data FIFO 168 as shown in FIG. 5. A decoder 170 such as a Motorola Schottky-type SN74LS138 is shown coupled to the microprocessing unit at the node. The microprocessing unit can be a Motorola-type MC6803. The data busy signal DBSY 78 and start-of-frame signal 66 are coupled to the MPU. The MPU provides an address signal to decoder 170. A serial to parallel 8-bit shift register 172 receives data from the data bus or data slot. An 8-bit parallel to serial (P/S) shift register 174 is provided to shift data to the data bus through a hex buffer 176. The shift registers 172, 174 can be Motorola Schottky-type 74LS299 and 74LS165, respectively. The hex buffer can be a tri-state Motorola CMOS-type MC14503. A microprocessor data bus 178 connects the MPU to shift registers 172, 74. The decoder 170 provides a MUX data read signal 180 and is coupled to the $\overline{OE}$ input of shift register 172 to enable shifting data from register 172 to the bus 178. Decoder 170 provides a MUX data write signal 182 coupled to the $\overline{PL}$ enable input of shift register 174 to enable shifting data to the data bus through tri-state buffer 176. The data clock signal 52 is input into shift registers 172, 74 to enable shifting the data at the data clock rate. The data grant signal DG controls the tri-state buffer 176 so that it is enabled only when the particular node has been granted the use of the data bus.

Figure 7:
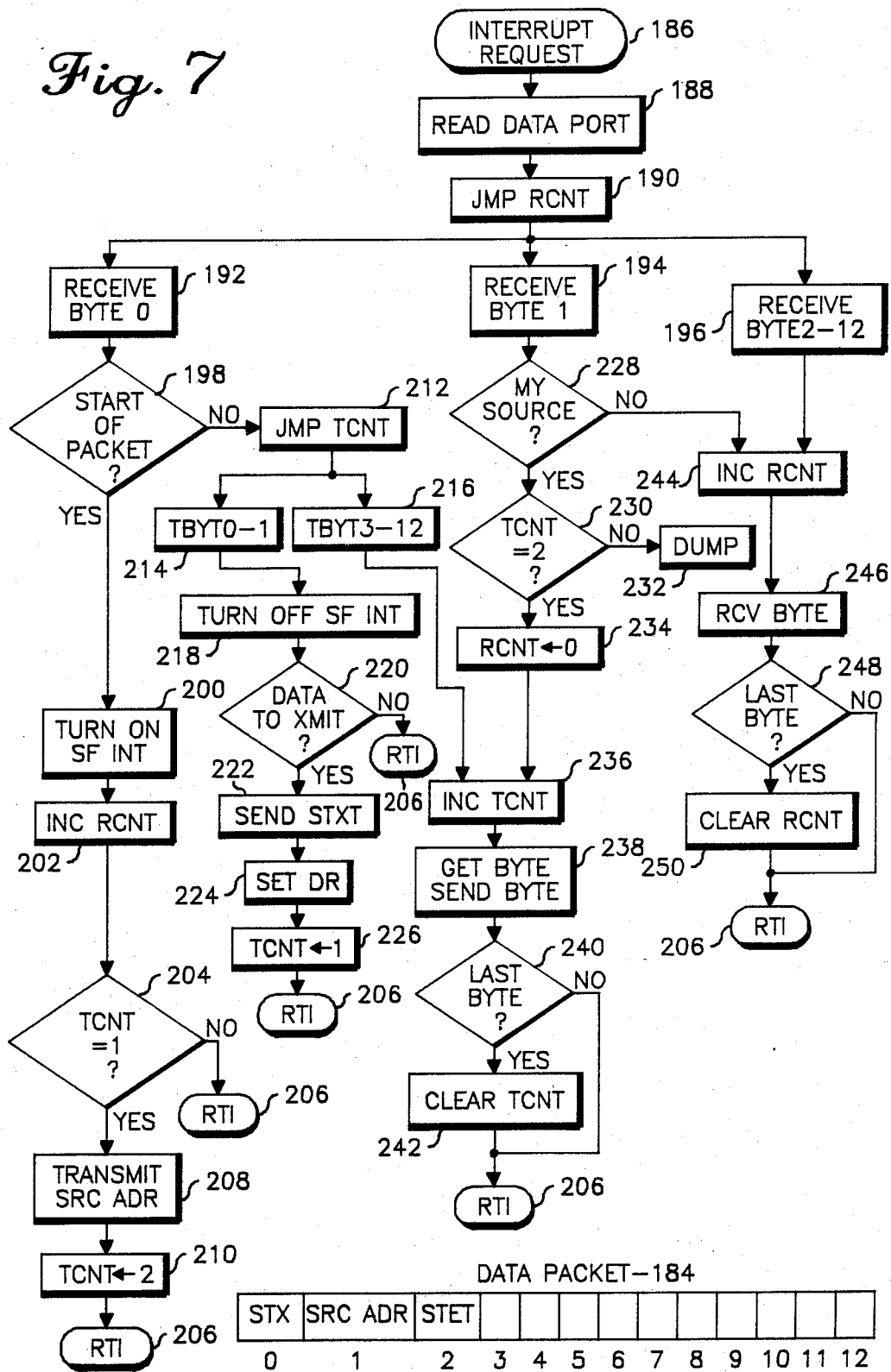
FIG. 7 is a logic flow diagram for control of the data channel access port as shown in FIG. 5.

Referring to FIG. 7, there is shown a logic flow diagram for control of the data channel access port as shown in FIG. 5. A data packet 184 is illustrated as including thirteen 8 bit bytes with byte zero providing the start of text (STX), byte one indicating the source address SRC ADR and byte two indicating the destination address. Two variables, RCNT and TCNT, are referenced in the flow diagram. Both of the variables are set to zero during normal operation. When a data packet is being received, RCNT is incremented to indicate which byte in the 13 byte packet 184 is to be received next. Similarly, TCNT is incremented when a data packet is being transmitted to indicate which byte is to be transmitted next.

The Interrupt Request block 186 is called by one of two interrupting signals, DBSY 78 or SF 66. The DBSY signal is connected to the non-maskable interrupt input of the MPU. Any time the DBSY signal 78 goes high, the MPU jumps to the Interrupt Request block 186. The SF signal 66 is connected to a maskable interrupt input to the MPU. The MPU can controllably mask and unmask the SF interrupt. If the SF interrupt is unmasked and the SF pulse 66 occurs, the MPU will jump to the Interrupt Request block 186. Conversely if the SF interrupt is masked, then no action will be taken in response to the SF pulse 66. In normal operation the MPU functions to unmask the SF interrupt when a data packet is ready for transmission and also when a data packet is being received. This allows the MPU to synchronize with the data slot on the TDM bus 28.

An interrupt request block 186 receives the interrupt request and passes the signal to a read data port block 188. The read data port block 188 causes the MPU to read the data byte received from the data slot by shift register 172 and then passes the signal to a jump RCNT block 190. From the jump RCNT block 190, the signal is passed to either the Receive Byte O block 192, the Receiver Byte 1 block 194 or the Receive Byte 2 through 12 block 196, depending on the current value of the variable RCNT. Received byte 0 block 192 passes the signal to a start-of-packet decision block 198. This block determines if it is the start of a data packet by determining if the interrupt was caused by DBSY 78 rather than SF 66. Then the signal is passed to a turn on start-of-frame interrupt block 200 that unmasks the SF interrupt and passes the signal to an increase receive count block 202. The signal is passed by block 202 to a decision block 204 that determines if the TCNT is equal to one. If it is not equal to one, the signal is passed to a return from interrupt block 206. If the TCNT is equal to one, the signal is passed to a transmit source address block 208. Transmit source address block 208 passes the signal to a block 210 to set TCNT equal to two. Block 210 passes the signal to the return from interrupt block 206.

If decision block 198 determines it is not the start of the data packet, then the signal is passed to a jump TCNT block 212. Block 212 passes the signal to blocks 214 or 216 depending on the value of variable TCNT. Block 214 corresponds to byte 0 and 1. Block 216 corresponds to T count byte 3 through 12. Block 214 passes the signal to a turn-off start-of-frame interrupt block 218. Block 218 passes the signal to a decision block 220 that decides if there is data to transmit. If there is data to transmit, block 220 passes a signal to a send/start of text block 222. Block 222 writes the STX byte of the data packet into the transmit shift register 174 for transmission into the data slot and then passes the signal to a set data request block 224. Block 224 outputs the $\overline{DR}$ pulse 152 and then passes the signal to set TCNT equal to one at block 226. Block 226 passes the signal to the return from interrupt block 206. If decision block 220 determines there is not data to transmit, the signal is passed to return from interrupt block 206.

Receive byte 1 block 194 passes the signal to a decision block 228 that determines if the source address (SEC ADR) byte read from the data slot through shift register 172 corresponds to the particular node. If yes, block 228 passes the signal to block 230 to determine if TCNT is equal to 2. If it is not the correct bit corresponding to the destination address, the signal is passed to a dump block 232. If TCNT is equal to 2, block 230 passes the signal to block 234 that sets RCNT equal to zero. This indicates to the MPU that it now has control of the data slot. Block 234 passes the signal to block 236 where the TCNT is incremented. Block 236 passes the signal to block 238 to get the next byte to be transmitted and send the byte. Block 238 passes the signal to a decision block 240 that determines if the last byte has been sent. If the last byte has not been sent, the signal is passed from block 240 to the return from interrupt 206. If the last byte has been received, block 240 passes the signal to a block 242 to clear the TCNT (i.e. set TCNT equal to zero). Block 242 passes the signal to the return from interrupt block 206.

If decision block 228 determines that the source address does not correspond to that particular node, the signal is passed to an increment RCNT block 244. Increment RCNT block 244 passes the signal to a receive byte block 246. Receive byte block 246 loads the byte read from the data port into a receive data packet queue and then passes the signal to a decision block 248 that determines if the last byte has been received. If the last byte has not been received, block 248 passes the signal to the return from interrupt block 206. If the last byte has been received, block 248 passes the signal to block 250 to clear RCNT by setting it equal to zero.

Recieve byte 2 through 12 block 196 also passes the signal to increment RCNT block 244 and the signal flow proceeds as described above.

While a preferred embodiment of the invention has been described in detail, it should be understood that many modifications and variations are possible that may fall within the true spirit and scope of the invention as defined in the appended claims.

I claim:

1. A multiple access data communications controller for unifying the operation of a plurality of synchronous communication nodes and a time-division multiplex bus comprising:
    (a) means for sequentially polling each of a plurality of synchronous nodes;
    (b) means for receiving a signal from a synchronous node;
    (c) means for simultaneously granting control of a predetermined data slot on the time-division multiplex bus to said requesting node for a predetermined time and inhibiting said sequential polling means;
    (d) means for resuming sequential polling at the node following said requesting node in the sequence, whereby each of said plurality of nodes is provided equal access to a predetemined data slot; and
    (e) timing means for synchronizing the operation of said synchronous nodes, said time-division multiplex bus and said multiple access data communication controller.

2. The apparatus as claimed in claim 1 further comprising means for relating each of said nodes to a predetermined time slot on the time-division multiplex bus.

3. A multiple access data communications controller for use in a communications system providing for bidirectional audio and data transfer between a plurality of nodes and including a time-division multiplex bus connecting the nodes with a unique one of the recurrent time slots defined by the time-division multiplex bus corresponding to each of the plurality of nodes and a dedicated recurrent data time slot, said controller providing equal access to the dedicated data slot to each of the nodes comprising:
    timing means for enabling synchronous operation with the time division multiplex bus;
    means for sequentially polling each of the plurality of nodes;
    means for receiving a requesting signal from a requesting node;
    means for simultaneously granting control of the data time slot to said requesting node and inhibiting said sequential polling means for a predetermined time;
    means for enabling designated one of the plurality of nodes to receive data; and
    means for resuming sequential polling at the node following said requesting node in the sequence.

4. The apparatus as claimed in claim 3 wherein said timing means for enabling synchronous operation with the time-division multiplex bus include a bit rate clock means, counter means coupled to said bit rate clock means for generating a start-of-frame signal and data clock means.

5. Method of assigning a dedicated data slot on a time-division multiplex bus to one of a plurality of nodes such that each of the plurality of nodes has equal access to the dedicated data slot, the method comprising the steps of:
    (a) sequentially polling the plurality of nodes;
    (b) receiving a requesting signal;
    (c) inhibiting the polling and simultaneously granting control of the dedicated data slot to said requesting node for a predetermined time; and
    (d) resuming sequential polling following said requesting node.

* * * * *

UNITED STATES PATENT AND TRADEMARK OFFICE
CERTIFICATE OF CORRECTION

PATENT NO. : 4,603,418

DATED : July 29, 1986

INVENTOR(S) : Greg M. Townsend

It is certified that error appears in the above-identified patent and that said Letters Patent is hereby corrected as shown below:

In column 13, line 8, after "node" insert --requesting use of the time-division multiplex bus--.

In column 13, line 20-21, change "communication" to --communications--.

In column 14, line 4, change "time division" to --time-division--.

In column 14, line 12, change "one" to --ones--.

In column 14, line 18, change "include" to --includes--.

Signed and Sealed this

Seventh Day of April, 1987

Attest:

DONALD J. QUIGG

*Attesting Officer*  *Commissioner of Patents and Trademarks*